H. Z. COBB.
METHOD OF MAKING RUBBER TIRES.
APPLICATION FILED JAN. 14, 1909.
969,131.
Patented Aug. 30, 1910.
3 SHEETS—SHEET 1.
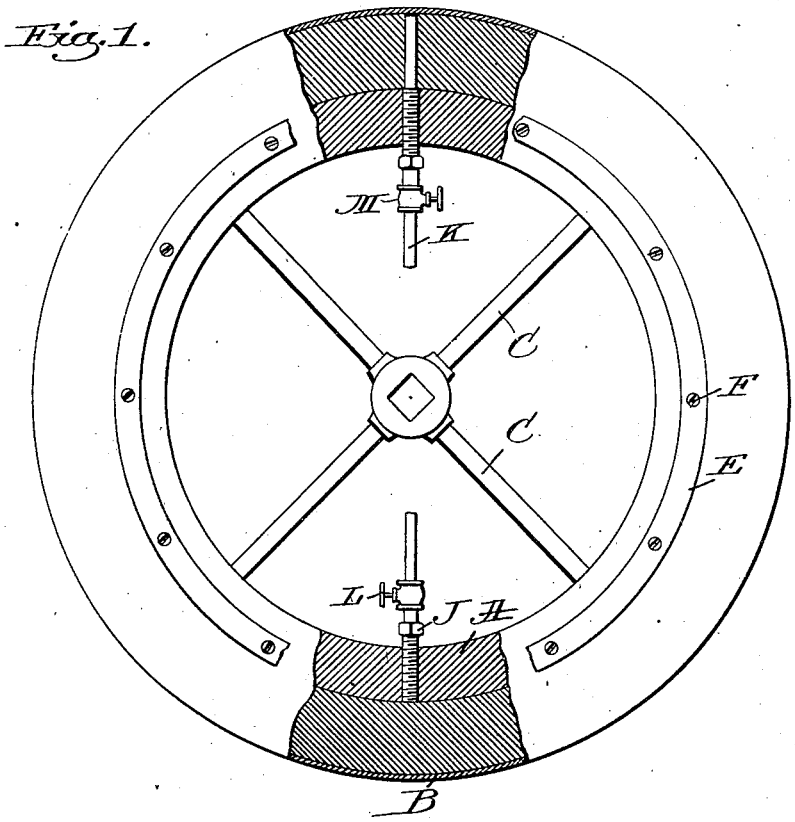
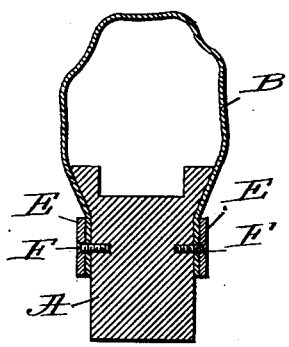
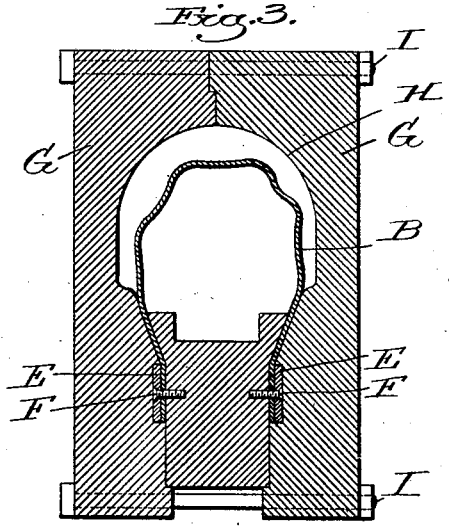
Witnesses:
Fred S. Greenleaf
Joseph M. Ward
Inventor:
Henry Z. Cobb,
by Crosby & Gregory
Attys.

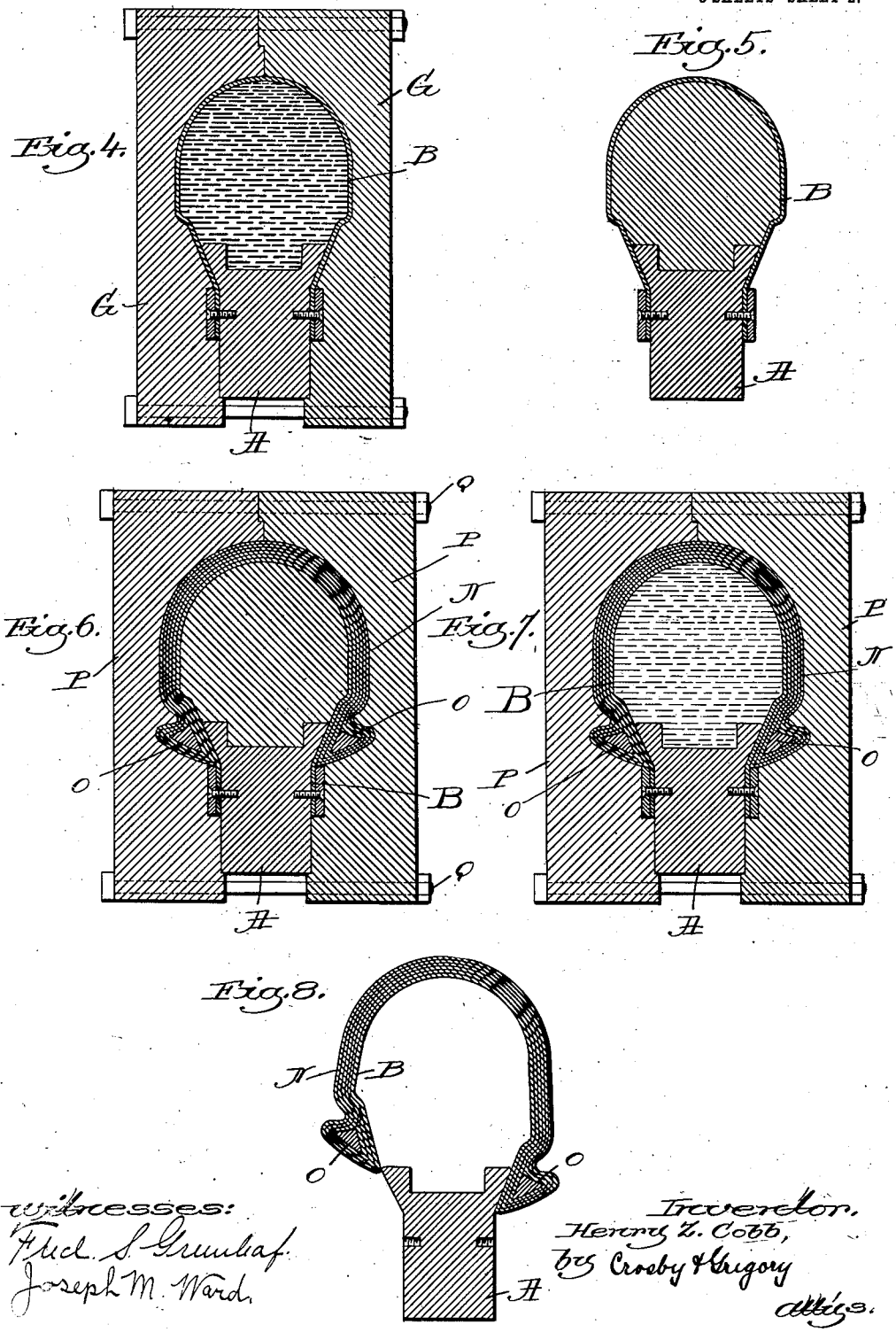

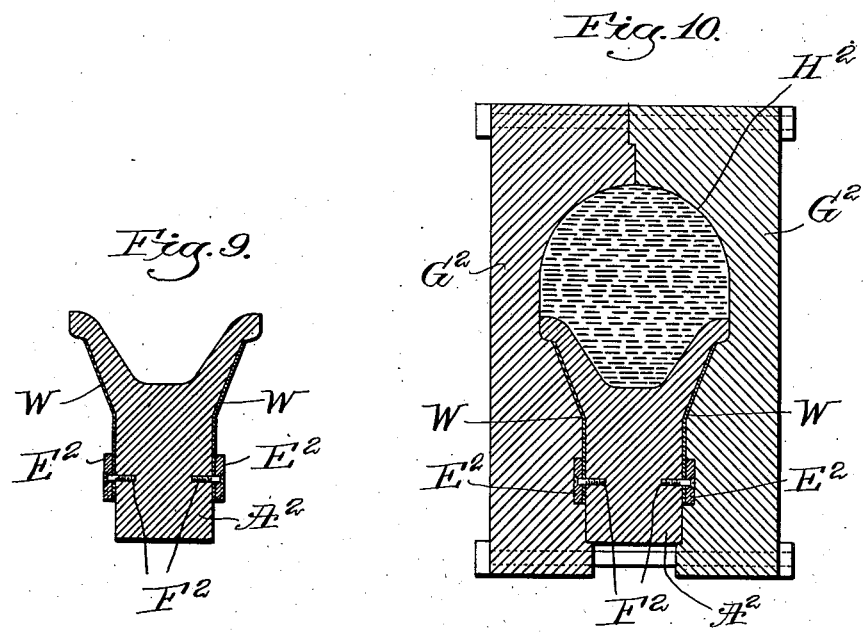
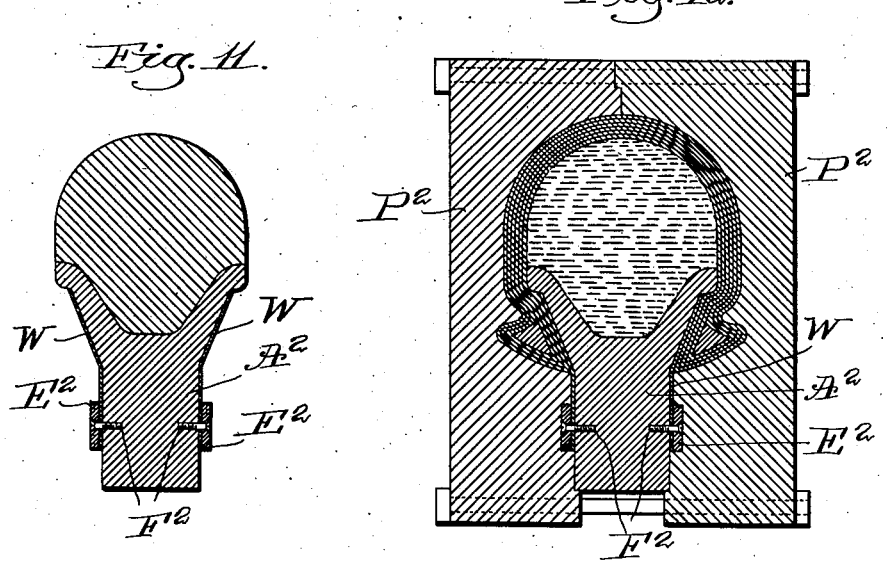

UNITED STATES PATENT OFFICE.

HENRY Z. COBB, OF MALDEN, MASSACHUSETTS.

METHOD OF MAKING RUBBER TIRES.

969,131.  Specification of Letters Patent.  Patented Aug. 30, 1910.

Application filed January 14, 1909. Serial No. 472,237.

*To all whom it may concern:*

Be it known that I, HENRY Z. COBB, a citizen of the United States, and a resident of Malden, in the county of Middlesex and State of Massachusetts, have invented an Improvement in Methods of Making Rubber Tires, of which the following description, in connection with the accompanying drawing, is a specification, like letters on the drawing representing like parts.

This invention relates to the process of manufacturing rubber tires and has for its object the securing of accurately and properly shaped tires thoroughly cured or vulcanized.

Important steps in the process of this invention are the forming of a liquable, annular mandrel rim of solidified fluid of the required shape, preferably, by the filling of an annular, expansible, hollow, shell, mandrel with a fluid under pressure to cause the shell to take on a predetermined shape, over which the tire may be built up; the building up of the tire over this liquable rimmed mandrel after its solidification to present a rigid mandrel; the vulcanizing of the tire while inclosed between an exterior mold and the said mandrel with the space previously occupied by the solidified fluid filled with fluid under high pressure so that the vulcanization takes place while the tire is under heavy pressure; and the withdrawal of the fluid after vulcanization to permit the ready removal of the tire from the mandrel without injury to its structure, and in particular to the restraining beads which are embedded in the edges of the tire. These and other features of the invention will more fully appear from the accompanying description and drawings and will be particularly pointed out in the claims.

The drawings illustrate, principally by means of views in cross section, the position of the parts in various steps in the process of making the tire, two slightly different ways of carrying out the process being illustrated.

Figures 1 to 8 inclusive illustrate the process when the liquable rim is formed by an annular expansible shell filled with the solidified fluid while the remaining figures illustrate the process when the liquable rim is not provided with the expansible shell.

Fig. 1 is a side view, partially in cross section, of the mandrel mounted upon the spokes of the make-up wheel and ready for the step of building up the tire. Fig. 2 is a radial cross section through the mandrel after the expansible shell has been clamped in place. Fig. 3 is a similar view after the mandrel has been inclosed in the mold defining the inner surface of the tire. Fig. 4 is a similar view after the mandrel has been filled with fluid under pressure. Fig. 5 is a similar view after the contents of the mandrel have solidified and the mold shown in Fig. 4 has been removed. Fig. 6 is a similar view after the tire has been built up on the mandrel and the mandrel and overbuilt tire have been inclosed by a mold defining the outer surface of the tire. Fig. 7 is a view similar to Fig. 6 with the mandrel filled with fluid under pressure. Fig. 8 is a similar view with the exterior mold removed, the contents of the mandrel withdrawn, and the tire shown as being slipped off from the rigid base of the mandrel. Fig. 9 is a radial cross section of the base portion of an annular mandrel for carrying out the process in the other way referred to. Fig. 10 is a similar view after the part shown in Fig. 9 has been inclosed in the mold defining the inner surface of the tire and the inclosed space filled with fluid under pressure. Fig. 11 is a similar view after the fluid has solidified and the mold shown in Fig. 10 has been removed. Fig. 12 is a similar view after the tire has been built up on the liquable rimmed mandrel and the mandrel and overbuilt tire have been inclosed by a mold defining the outer surface of the tire.

In carrying out the invention, in the preferred way first illustrated, I employ an annular, expansible, hollow, shell, mandrel adapted to take on the shape required when filled with fluid under pressure and to retain the required shape when the fluid has solidified. Such a mandrel is illustrated herein and is shown as comprising an annular base portion or member A and an annular expansible shell B adapted to be filled with a fluid and solidified to form a liquable rim. The annular base member A of the mandrel is adapted to be supported in the usual manner by spokes C of the usual make-up wheel, these spokes being screwed into the base of the mandrel for that purpose. The base portion A may be made of any suitable material, such as iron or steel. The shell B is made of any compaiatively thin expansible suitable material, but I prefer and use sheet rubber, either cured or uncured. By the term "rubber" I include all suitable rubber compounds or substitutes. If the rubber shell be cured it retains its entity after the vulcanization of the tire, but if it be uncured it becomes integral with the tire during vulcanization and constitutes the inner surface of the tire. The shell B is clamped in place upon the base A in any suitable manner; flat, annular, metallic strips E held in place by screws F being illustrated for that purpose. The shell when clamped in position is somewhat less in cross section than the required cross section of the mandrel for use in building up the tire thereover. The required size and shape of the mandrel is secured by providing annular, hollow, mold members shown in cross section at G. The inner surface H of these mold members when clamped together defines the required or predetermined exterior surface of the mandrel. These mold members are clamped in place by suitable bolts I upon the opposite sides of the mandrel. The mandrel is provided with pipes J, K, passing through the base and opening into the hollow portion of the mandrel or that portion to be occupied by the liquable rim. These pipes are preferably arranged diametrically opposite and one of them, as K, extends nearly to the outer periphery of the shell and may be adjusted in that respect by means of its screw-threaded engagement with the base of the mandrel. Each pipe is provided with a valve L, M, respectively.

After the parts have been assembled as illustrated in Fig. 3 a suitable fluid which solidifies readily at a low temperature is forced into the hollow mandrel. Various fluids may be used for this purpose, but I prefer ordinary paraffin rendered liquid by heat. For this purpose the mandrel is set up to present the pipe K at the top. The valves L and M are opened and the liquid paraffin injected through the pipe J. As it rises in the mandrel the air is driven out through the pipe K, and when the mandrel is filled with the liquid paraffin the valve M is closed and the liquid paraffin is forced in under pressure until the expansible shell B is forced into conformation with the inner surface of the mold, when the parts will be in the position illustrated in Fig. 4. The valve L is then closed. The fluid contained in the mandrel, herein described as liquid paraffin, is then permitted to solidify, and after it has solidified the mold members G are removed, leaving the mandrel shell filled with the solidified fluid, such as solid paraffin, forming a liquable rim and presenting an exterior surface such as required for the building up of the tire. The tire is then built up on the mandrel in the usual manner, and there being nothing novel in this operation it need not be described. The tire is illustrated in Fig. 6 as thus built up and comprising the usual layers N of canvas and rubber and the usual beads O of hard rubber or other suitable material. After the tire has been built up upon the mandrel the whole is inclosed by the mold members P, the inner surface of which conforms to the exterior surface of the completed tire, and these mold members are locked in place by the usual bolts Q. The parts are then as represented in Fig. 6. In building up the tire the outer surface is left slightly smaller in cross section than it is to be when vulcanized, so that when the next step of the process takes place the tire is expanded to conform to the mold without wrinkling the fabric. The next step is to produce a heavy fluid pressure within the space occupied by the solidified fluid, or in other words within the shell of the mandrel to compact the layers of the tire and force the outer surface thereof into conformation with the inner surface of the mold members P. This may be performed in various ways. For example, the paraffin may be turned into liquid by the application of heat, and an additional amount of paraffin forced in under pressure, or steam or warm water may be forced in without removing the paraffin, or air may be forced in either with the paraffin or after the paraffin has been withdrawn. In practice it is preferred to liquefy and withdraw the paraffin and force in water under heavy pressure, but any suitable fluid may be employed. The parts after this step has been performed are illustrated in Fig. 7. The tire thus inclosed between the exterior mold members and the mandrel filled with fluid under high pressure is then vulcanized in the usual manner, the high pressure being maintained. If the expansible shell of the mandrel is formed of uncured rubber it becomes during the process of vulcanization of the rubber an integral part of the tire and forms the inner surface thereof. If formed of other material it retains its identity and remains a part of the mandrel. After the process of vulcanization has been completed the fluid contents of the mandrel are then wholly or partially withdrawn, enabling the tire to be readily removed from the base part of the mandrel without stretching or injuring the tire, and in particular without straining the beads at the edge of the tire. If the shell of the mandrel retains its identity it collapses upon the withdrawal of the fluid contents and the tire is readily slipped over it. In Fig. 8 that form is illustrated wherein the shell B being made of uncured rubber has become an integral part of the tire N. The metallic strips E have been removed, together with the free edges of the shell. The tire is shown with one edge just clearing the base of the mandrel A, thus indicating how slight a distortion of the tire is caused by its removal from the mandrel.

Another way of carrying out the process which involves the main features of this invention eliminates the use of that element which is hereinbefore referred to as an expansible shell. The liquable rim of the mandrel may be formed entirely by the solidified fluid such as paraffin already referred to. An important feature of the invention resides in the liquable rim, however formed, so that the tire may be built up over the mandrel provided with this liquable rim while the rim is in a hard and firm condition defining the required shape and then during vulcanization the space occupied by the rim may be filled with fluid under heavy pressure, that fluid being either the fluid formed by the liquefaction of the rim or any other suitable fluid either alone or intermingled therewith, and then upon the completion of vulcanization the fluid may be drawn off enabling the completed tire to be removed without undue distortion. The manner in which this form of the process may be carried out will be apparent from the foregoing description and illustration of the preferred form of the process, together with the additional Figs. 9 to 12 inclusive of the drawings. In this form of the process the annular base portion or member $A^2$ of the mandrel is constructed and supported in general similar to that already described, except that it preferably has a greater radial depth and preferably outlines the irregular lower interior portion of the tire. This base portion of the mandrel is illustrated in cross section in Fig. 9. In carrying out the process, this base member $A^2$ of the annular mandrel is kept in place between annular hollow mold members shown in cross section at $G^2$, and similar to those already described and held in place in a similar manner. The interior surface $H^2$ of these mold members when clamped together defines the required or predetermined exterior surface of the rim of the mandrel. The mandrel is provided with the same system of pipes and valves as already described. Suitable packing is also provided between the base portion of the mandrel and the mold members, and is herein shown as thin, annular strips of rubber W held in place by annular metallic strips $E^2$ in turn fastened on the mandrel by screws $F^2$. After the parts have been thus assembled as illustrated in Fig. 10, the proper fluid such as already described, and, as I prefer, ordinary paraffin rendered liquid by heat, is injected through the pipe J into the space inclosed by the mold members $G^2$ in the same manner as that already described. The pressure under which the fluid is injected causes it to fit closely to, and come into conformation with, the inner surface of the mold members. The fluid is shown in Fig. 10 as filling this space. The fluid is then permitted to solidify and after it has solidified the mold members $G^2$ are removed, leaving the mandrel as illustrated in Fig. 11, constituted of a metallic base portion $A^2$ and a liquable rim formed of the solidified fluid, these parts presenting the required exterior surface for the building up of the tire. The tire is then built up on the mandrel in the usual manner as already described. After the tire has been built up upon the mandrel the whole is inclosed by the mold members $P^2$, the inner surface of which conforms to the exterior surface of the complete tire as in the previous case, and these members are locked in place by the usual bolts already described. As in the previous case the cross section of the built up tire is left slightly smaller than the cross section of the space in the mold members. Suitable packing between the base portion $A^2$ of the mandrel and the mold members $P^2$ is provided, such as already described. The next step is as before to produce a heavy fluid pressure inside the tire to compact the layers of the tire and force the outer surface thereof into conformation with the inner surface of the mold members $P^2$. This may be performed in various ways as when the shell already described is used, but preferably the solidified paraffin is liquefied and withdrawn and water under heavy pressure forced into the space. When this has been done the parts are as illustrated in Fig. 12. The tire thus inclosed is as in the other form of the process then vulcanized in the usual manner, the high pressure on the fluid being maintained during the process of vulcanization. After the vulcanization has been completed the fluid is then drawn off enabling the tire to be readily removed from the base portion of the mandrel without injuriously stretching or distorting it and in particular without straining the beads at the edge of the tire.

By the term "liquable" I refer to the broad quality in which the change from a solid into a fluid condition takes place, either by liquefaction or softening, or by diffusion in another liquid or fluid, or by the effects of heat, and by the terms "liquefaction" and "liquefying" I refer to the action of changing from a solid to a liquid under similar conditions.

Having fully described my invention, what I claim as new and desire to secure by Letters Patent is:

1. In the manufacture of open-base rubber tires, the process which comprises providing an annular mandrel having a rigid base portion and a liquable rim portion of solidified fluid, building up the tire over the rim and base portion of said mandrel, inclosing the built-up tire with an exterior mold, clamping the edges of the tire between the rigid mandrel base and the said exterior mold, vulcanizing said tire, and maintaining a high fluid pressure within the space between the mandrel base and the tire during vulcanization.

2. In the manufacture of open-base rubber tires, the process which comprises providing an annular mandrel having a rigid base portion and a liquable rim portion of solidified fluid, building up the tire over the rim and base portion of said mandrel, inclosing the built-up tire with an exterior mold, clamping the edges of the tire between the rigid mandrel base and the said exterior mold, vulcanizing said tire, maintaining a high fluid pressure within the space between the mandrel base and the tire during vulcanization, and withdrawing the fluid from said space after vulcanization to permit the ready removal of the tire from the mandrel.

3. In the manufacture of open-base rubber tires, the process of preparing the tire for exterior shaping, which comprises providing an annular mandrel having a rigid base portion, forming upon the said base portion a liquable rim of solidified fluid, maintaining a shaped mold about said rim portion until solidified, and building up the tire over the solidified rim and rigid base of the mandrel.

4. In the manufacture of open-base rubber tires, the process which comprises providing an annular mandrel having a rigid base portion, forming a hard liquable rim of the desired shape thereon, building up the tire over said rim and base portion, inclosing said mandrel and over-built tire within an exterior mold, liquefying said rim, and increasing the pressure in the space occupied by said rim to force the outer surface of the tire into conformation with the inner surface of the exterior mold.

5. In the manufacture of open-base rubber tires, the process which comprises providing an annular mandrel having a rigid base portion, forming a hard liquable rim of the desired shape thereon, building up the tire over said rim and base portion, inclosing said mandrel and over-built tire within an exterior mold, liquefying said rim, increasing the pressure in the space occupied by said rim to force the outer surface of the tire into conformation with the inner surface of the exterior mold, vulcanizing the tire during the maintenance of said high pressure, and then withdrawing the fluid contents from said space to allow the removal of the tire from the mandrel without undue distortion.

6. In the manufacture of open-base rubber tires, the process which comprises providing an annular mandrel having a rigid base portion, forming upon the said base portion a liquable rim of solidified fluid, maintaining a shaped mold about said rim until solidified, building up the tire over said liquable rim and rigid base, inclosing said mandrel and over-built tire within an exterior mold, liquefying said rim, increasing the pressure in the space occupied by said rim to force the outer surface of the tire into conformation with the surface of the exterior mold, vulcanizing the tire during the maintenance of said high pressure, and withdrawing the fluid contents from said space to allow the removal of the tire from the mandrel without undue distortion.

7. In the manufacture of rubber tires, the process which comprises filling an annular, expansible, hollow, shell, mandrel with a fluid under pressure to cause the shell to conform to a predetermined shape, permitting said fluid to solidify to cause said shell to retain the mold shape, building up the tire over said shaped shell.

8. In the manufacture of rubber tires, the process which comprises filling an annular, expansible, hollow, shell, mandrel with a fluid under pressure to cause the shell to conform to the inner surface of a confining mold, permitting said fluid to solidify to cause said shell to retain the mold shape, building up the tire over said shaped shell.

9. In the manufacture of rubber tires, the process which comprises filling an annular, expansible, hollow, shell, mandrel with a fluid under pressure to cause the shell to conform to the inner surface of a confining mold, permitting said fluid to solidify to cause said shell to retain the mold shape, building up the tire over said shaped shell, vulcanizing said tire while inclosed between an exterior mold and said shell filled with fluid under high pressure.

10. In the manufacture of rubber tires, the process which comprises filling an annular, expansible, hollow, shell, mandrel with a fluid under pressure to cause the shell to conform to the inner surface of a confining mold, permitting said fluid to solidify to cause said shell to retain the mold shape, building up the tire over said shaped shell, vulcanizing said tire while inclosed between an exterior mold and said shell filled with fluid under high pressure, and withdrawing the fluid contents of said shell to permit the ready removal of the tire.

11. In the manufacture of rubber tires, the process which comprises filling an annular, expansible, hollow, shell, mandrel with a fluid under pressure to cause the shell to conform to the inner surface of a confining mold, solidifying said fluid to cause said shell to retain the mold shape, building up the tire over said shaped shell, inclosing said shaped shell and over-built tire within a mold, increasing the pressure in said shell to force the outer surface of the tire into conformation with the surface of the mold.

12. In the manufacture of rubber tires, the process which comprises filling an annular, expansible, hollow, shell, mandrel with a fluid under pressure to cause the shell to conform to the inner surface of a confining mold, solidifying said fluid to cause said shell to retain the mold shape, building up the tire over said shaped shell, inclosing said shaped shell and over-built tire within a mold, increasing the pressure in said shell to force the outer surface of the tire into conformation with the surface of the mold, and vulcanizing the tire during the maintenance of said high pressure.

13. In the manufacture of rubber tires, the process which comprises filling an annular, expansible, hollow, shell, mandrel with a fluid under pressure to cause the shell to conform to the inner surface of a confining mold, solidifying said fluid to cause said shell to retain the mold shape, building up the tire over said shaped shell, inclosing said shaped shell and over-built tire within a mold, increasing the pressure in said shell to force the outer surface of the tire into conformation with the surface of the mold, vulcanizing the tire during the maintenance of said high pressure, and withdrawing the fluid contents of said shell to allow its collapse and the removal of the tire without undue distortion.

14. The process of preparing a mandrel for the manufacture of rubber tires, which comprises filling an annular, expansible, hollow, shell, mandrel with a fluid under pressure, maintaining an exterior confining mold about said shell whereby the shell is forced into conformation with the inner surface of the mold, and then permitting said fluid to solidify to cause said shell to retain the mold shape.

15. In the manufacture of rubber tires, the process which comprises forming an annular, expansible, hollow, shell, mandrel filled with, and shaped by, a solidified fluid, building up the tire thereover inclosing said shaped shell and over-built tire within a mold, increasing the pressure in said shell to force the outer surface of the tire into conformation with the surface of the mold, and vulcanizing the tire during the maintenance of said high pressure.

16. In the manufacture of rubber tires, the process which comprises forming an annular, expansible, hollow, shell, mandrel filled with, and shaped by, a solidified fluid, building up the tire thereover inclosing said shaped shell and over-built tire within a mold, and vulcanizing the inclosed tire during the maintenance of an increased fluid pressure within said shell.

17. In the manufacture of rubber tires, the process which comprises the forming of an exterior mold and an annular, elastic, hollow, shell, mandrel filled with, and shaped by a solidified fluid, inclosing a tire between said mold and mandrel, vulcanizing the inclosed tire, and maintaining an increased fluid pressure within said shell during vulcanization.

18. In the manufacture of rubber tires, the process which comprises inclosing a tire between an exterior mold and an annular, elastic, hollow, shell, mandrel filled with, and shaped by, a solidified fluid, vulcanizing the inclosed tire, maintaining an increased fluid pressure within said shell during vulcanization, and withdrawing the fluid contents of said shell to permit the ready removal of the tire from the mandrel.

In testimony whereof, I have signed my name to this specification, in the presence of two subscribing witnesses.

HENRY Z. COBB.

Witnesses:
 BESSIE G. MORRIS,
 MABEL PARTELOW.